United States Patent [19]

Scata et al.

[11] Patent Number: 5,024,316

[45] Date of Patent: Jun. 18, 1991

[54] SORTING UNIT FOR BELT CONVEYOR SYSTEMS

[75] Inventors: Mario Scata; Adolfo Passero, both of Teramo, Italy

[73] Assignee: Meccanizzazione Postale E Automazione SpA, Piane di Sant'Atto, Italy

[21] Appl. No.: 382,759

[22] Filed: Jul. 21, 1989

[30] Foreign Application Priority Data

Jul. 21, 1988 [IT] Italy .................. 21432 A/88

[51] Int. Cl.$^5$ ...................... B65G 37/00; B65G 47/38; B07C 5/36
[52] U.S. Cl. .................... 198/369; 198/592; 198/631; 209/698
[58] Field of Search ............... 209/606, 698, 707, 924, 209/925, 933, 941; 198/369, 370, 592, 627, 631, 833, 858, 861.5; 414/794.4, 794.5

[56] References Cited

U.S. PATENT DOCUMENTS

| 1,711,576 | 5/1929 | Paterson | 198/592 |
| 2,639,800 | 5/1953 | Atwood | 198/592 |
| 3,275,135 | 9/1966 | Niese | 209/698 X |
| 3,348,678 | 10/1967 | Flowers | 209/698 X |
| 3,404,775 | 10/1968 | McClellan | 198/369 X |
| 3,643,798 | 2/1972 | Krupotich | 209/606 X |
| 3,848,725 | 11/1974 | Toby | 198/861.5 X |

FOREIGN PATENT DOCUMENTS

| 3510570 | 7/1986 | Fed. Rep. of Germany | 209/698 |
| 2390902 | 12/1978 | France | 198/631 |
| 8803508 | 5/1988 | PCT Int'l Appl. | |
| 0912308 | 3/1982 | U.S.S.R. | 209/606 |

Primary Examiner—Margaret A. Focarino
Assistant Examiner—Edward M. Wacyra
Attorney, Agent, or Firm—Spencer & Frank

[57] ABSTRACT

A sorting unit for belt conveyor systems is disclosed wherein the actuating mechanisms of the sorting conveyor belt comprise a driving roller exially connected to one of the transmission rollers between which the sorting belt extends, and controlled by an actuating belt friction-coupled thereto by two counter-rollers. When the belt, upon action of control mechanisms, lowers laterally for the discharge of the carried object, the contact driving roller-actuating belt lacks, thus causing a quasi-instantaneous stop of the sorting belt and therefore a controlled trajectory of the sorted object.

4 Claims, 2 Drawing Sheets

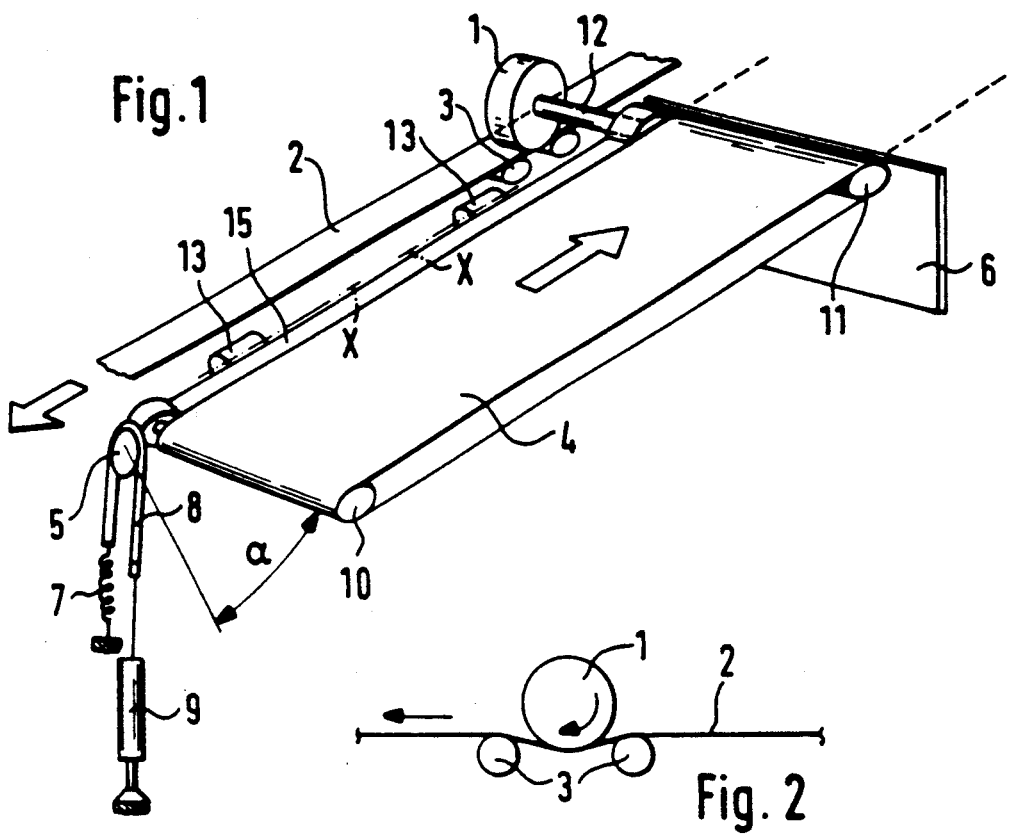
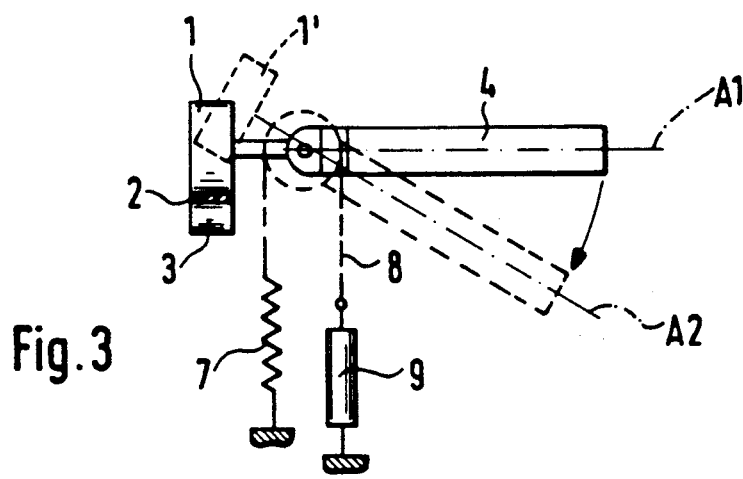

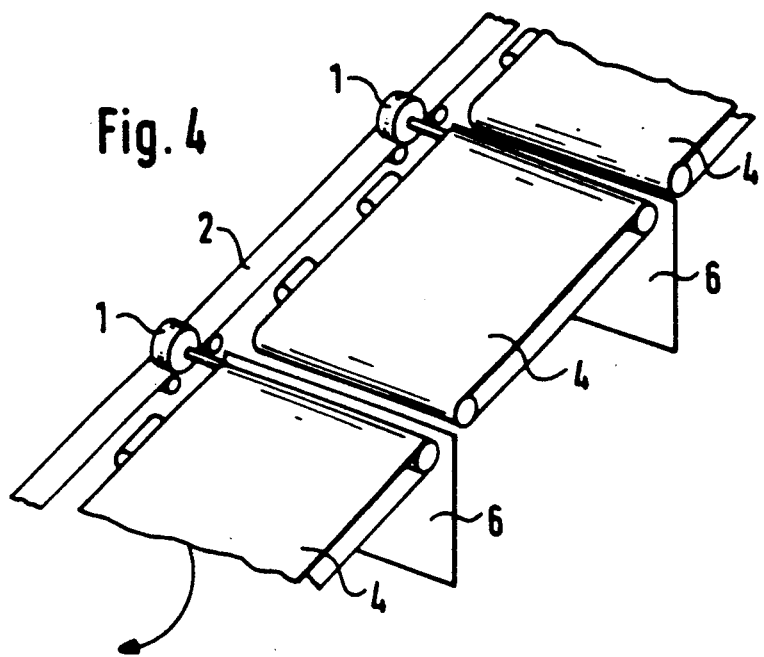
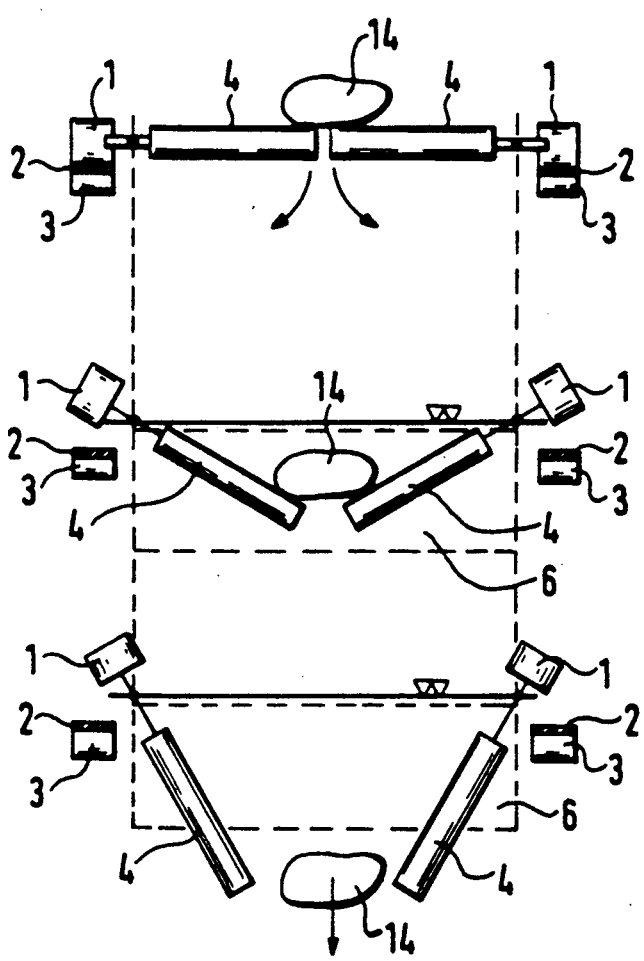

SORTING UNIT FOR BELT CONVEYOR SYSTEMS

The present invention relates to a sorting unit for a belt conveyor system of the kind comprising at least a sorting conveyor belt, extending among transmissione rollers and revolvingly oscillating around an oscillation axis extending in parallel and close to one of its longitudinal edges, actuating means to operate the sorting belt and control means to rotate the sorting belt around the oscillation axis bringing it from a rest position, where it lays horizontally flush with further conveyor belts being parts of said conveyor system, to a delivery position, where it is transversally oped and vice-versa.

As it is known, belt conveyor systems comprise, generally, one or more main conveyor lines consisting of consecutive conveyor belt chains, along which sorting units of different kinds, which can be singly and selectively operated, and interposed in order to properly sort the objects carried by the main conveyor line on different secondary conveyor lines, or into containers arranged at the unit itself.

A sorting unit of the kind referred at the beginning, and particularly suitable for the sorting of floppy objects, is disclosed, for instance, in International Publication Number WO 88/03508 dated May 19, 1988, corresponding to U.S. application Ser. No. 07/223,202 filed Jun. 26, 1988, (Inventors: Mario Scata and Adolfo Passero) and to which reference is made for further details.

The main feature of this kind of sorting unit consists in speeding the object, to be sorted into an underlying container along a path as much straight as possible, in the vertical direction, in order that it keeps, during its free fall, a substantially horizontal orientation, obtaining accordingly a satisfactory piling-up of the sorted objects within the container.

The achievement of this effect is made easier in that, when the belts are brought from the rest position (horizontal) to the delivery position (vertical), they are forced to reduce the object dragging speed, thanks to the motion transmission through gears.

If the revolving angular speed, during the lowering of the belt, becomes equal to the speed of the shaft actuating the belt in a longitudinal sense, the dragging speed of the object can even be nullified.

Sorting units of this kind are generally effective and have excellent performances.

However, when sorting into containers having longitudinal formats a little greater than the corresponding sizes of the object, the above referenced units do not allow a sufficient accuracy. This is due to the fact that the stop condition of the belts, besides requiring a very high rotation angular speed of the belt, occurs near to the delivery position, namely too late, so that it often occurs that the front edge of the object, during the fall, hits against the edge of the container or even leaps it over, and that is really undesirable.

In this case, the technical task of the present invention is to eliminate the above-mentioned drawbacks through a sorting unit thanks to which the objects coming from a conveyor line may be let suitably fall down into an underlying container, even when this letter has longitudinal formats very close to the corresponding sizes of the object, and this without using considerable anglular revolving speeds during the lowering of the belt.

Within said task, the main object of the present invention is to provide a sorting unit of the kind referred at the beginning wherein the conveyor belt is stopped immediately after the start of the oscillating movement of the delivery of the object.

Another object of the present invention is to provide a sorting unit which features a simplified structure and which is easy to manufacture, in the sector industry, at lower costs compared with those of prior art units.

Not the last object of the present invention is to realize a sorting unit which can be easily aligned with sorting units of the same type to form multiple sorting stations.

These and other objects, which will become more apparent hereinafter, are achieved by a sorting unit for belt conveyor systems having the features set forth in the characterizing portion of claim 1.

Advantageous embodiments and improvements of the sorting unit, according to the invention, are illustrated in the subclaims.

Further characteristics and advantages of the invention will result better from the detailed description of a preferred, but not exclusive, embodiment of a sorting unit for belt conveyor systems, made herebelow with reference to the attached drawings, given as an indicative and not limitative example, in which:

FIG. 1 shows, schematically, an embodiment of the sorting unit according to the invention;

FIG. 2 shows, schematically, a detail of the actuating means of the sorting belt of the unit in FIG. 1;

FIG. 3 shows, schematically, the control means for rotating the sorting belt of the unit of FIG. 1;

FIG. 4 shows a series arrangement of sorting units, according to the invention, to form a multiple sorting station; and FIG. 5 shows an arrangement of two sorting units, according to the invention, associated to form a trap-door sorting unit.

Referring now in detail to the mentioned figures and in particular to FIG. 1, the sorting unit according to the invention includes substantially a sorting conveyor belt 4, extending between the transmission rollers 10,11. This belt can be formed by a single belt, as shown, or by a plurality of belt elements which, in such a way known per se, extend between said transmission rollers.

Besides, the sorting conveyor belt is revolvingly oscillatable around on oscillation axis x-x, extending in parallel and in correspondence of an edge thereof, to be brought, upon command, from a rest position, wherein it lays horizontally flush with other conveyor belts (see FIG. 4), to a delivery position wherein, as pointed out by a broken line on FIG. 1, it is transversally sloped through an angle α downwards, thus dropping the object sliding thereon into the underlying container (not shown).

Actuating means (1,2,3) are also provided which act on the sorting conveyor belt 4 so that a conventional translating dragging motion, in the running sense, may be established through one of the transmission rollers 10,11.

Originally, the actuating means are formed by an actuating belt 2 extending parallelly to said oscillation axis, and kept in a translating motion in a sense which is opposite to the running sense, and by a driving roller 1 connected to said one of transmission rollers through an axle 12, and located above the actuating belt 2 friction-coupled thereto by means of a pair of counter-rollers, located underneath the actuating belt 2 in a position symmetrical with respect to the tangency line of the driving roller, and arranged in such a way to increase the friction-strenghth between driving roller and actuating belt (see FIG. 2).

The travelling motion of the actuating belt can be achieved by conventional means which have not been shown, because known per sè, and anyway not relevant for the objects of the present invention.

Control means suitable for bringing the belt from the rest position to the delivery position and vice-versa, are associated with the sorting conveyor belt.

According to a preferred embodiment, there is provided that these control means comprise at least a fluid-dynamic cylinder 9 engaged at the steady framework and linked to an end of a chain 8, connected, in turn, to a return spring 7 having its other end fixed on the framework.

The chain 8 engages a toothed wheel 5 which is rigidly connected with a longitudinal bar 15, within which transmission rollers 10,11 are revolvingly engaged (see FIG. 1,3).

Advantageously, downstream the sorting belt 4, there is provided a stop plate 6 acting also as a reference for the container, particularly when the longitudinal format of the container exceeds slightly the corresponding size of the object to be sorted, so that the trajectory described by the sorted object requires more accuracy.

After having described the sorting unit of the invention in a mainly structural way, its operation will now be described. When in the rest position, the sorting conveyor belt 4, operated by the actuating belt 2 through the respective driving roller 1 connected to the respective transmission roller 11, forms with the conveyor belts of the conveyor plant and/or with the sorting conveyor belts of eventual sorting units subsequent thereto, a continuous surface, on which the objects to be sorted run. (running plane).

When the object to be sorted which is sliding on the sorting unit, must be dropped into the packing container, upon command from known and conventional means, the fluid-dynamic cylinder 9 is actuated. This latter, through the chain 8, acts on the toothed wheel 5 connected to the bar 15 which is hinged to the steady framework through the hinge 13, and rotates the belt downwards around the oscillation axis x-x, while applying simultaneously a tensile stress to the return spring 7 (see. FIG. 1 and 3).

Due to this rotation, the belt 4 reachs the delivery position, and therefore the object is allowed to drop into the underlying container.

During the downward motion of the belt and after an inclination through an angle of few degrees, the driving roller 1 losses the contact with the actuating belt 2, whereby the sorting belt 4 is almost instantaneously locked along its sliding motion at the beginning of the run downwards, and thus the trajectory of the sorted object is controlled better.

An eventual object inertia is controlled by the stop plate 6, the upper edge thereof being arranged at a level little lower down with respect to the running plane, whereby the object is stopped by the plate 6 (which acts also as a reference for the packing container, arranged with its front wall a little further on with respect to the plate) and skids on this latter toward downwards into the packing container itself; by means of this measure the trajectory of the object is prevented from being altered by the impact against the edge of the container.

Obviously, in case of not very accurate sortings into packing containers, sufficiently wide as compared with the object, or into sacks, the use of the plate 6 is not strictly necessary.

Immediately after the drop of the object, the belt 4 is automatically restored, by means of the return spring 7, in the rest position, so that a new object can be received by the conveyor line.

The present invention thus full achieves all the intended objects.

As evidenced in the above description, there is provided a sorting unit wherein the stoppping of the sorting occurs at the beginning of the delivery stroke since the actuation force of the sorting belt ceases after some slope degrees, owing to the loss of contact between the actuating belt and the driving roller.

Thanks to this solution the result is a unit structure which is very simple, low cost and easy to manufacture by the industry active in this field.

Besides, as evidenced by FIG. 3, the sorting unit according to the invention is easily associable with other sorting units of the same kind, so as to form multiple sorting stations.

On the other hand, by associating two faced units it is possible to obtain "trap-door" soring units particularly suitable for sorting floppy objects, such as folded clothing articles, as shown in FIG. 5. In that case, when in the rest position, the sorting belts 4 are arranged, with respect to the conveyor line, in such a way that the objects 14, sliding on the sorting unit, are hold by both the belts 4, substantially at two symmetrically opposed parts (see FIG. 5).

The immediate and simultaneous lowering of the surfaces supporting the object 14 acts so that this latter keeps advantageously, during its free fall, an almost horizontal orientation. In this way, even if the object is represented, for instance, by a clothing article, it is not subject to roll itself up upon the impact against the container.

Naturally, various modifications and variations may be added to the present invention, without departing in any way from the inventive concept which characterizes it.

For instance, in case of two units associated in parallel, such as to form a "trap-door" sorting unit for floppy objects, instead of providing separated control means for each section, a single fluid-dynamic cylinder, actuating simultaneously the two belts, may be used, whereas the chain and the toothed wheel can be replaced by a belt and a gulley respectively.

We claim:

1. A sorting unit for a belt conveyor system of the type comprising at least a sorting conveyor belt extending between transmission rollers revolvingly supported by a bar hinged to a steady framework, said sorting belt being swingable about an oscillation axis extending parallelly and close to a longitudinal edge actuating means to operate the sorting conveyor belt and control means for oscillating the sorting conveyor belt about said oscillation axis, bringing it from a rest position, where it lays horizontally flush with further conveyor belts being parts of said conveyor system, to a delivery position where it is transversally sloped downwardly, and viceversa, characterized in that said actuating means comprise an actuating belt extending parallelly to said oscillation axis and running in a direction opposite to the advancing direction of an object, at least one driving roller axially coupled to one of said transmission rollers and revolvingly arranged above said actuating belt, friction-coupled thereto my means of two counter-rollers located underneath said actuating belt in a position symmetrical with respect to the tangency line of said driving roller in such a way to assure in the rest position, the presence of a friction strength between the actuating belt and the driving roller.

2. A sorting unit according to claim 1, wherein said control means comprise a fluid-dynamic cylinder engaged at said steady framework and operating on one end of a chain engaged on a toothed wheel rigidly connected to said bar, said chain being connected to an end of a return spring having its other end fixed to said steady framework.

3. A sorting unit according to claim 2, further comprising a stop plate arranged downstream the sorting conveyor belt and transversally in relation to the running sense, said plate having its upper edge at a level a little lower down with respect to the running plane.

4. A sorting unit according to claim 1, further comprising a stop plate arranged downstream the sorting conveyor belt and transversally in relation to the running sense, said plate having its upper edge at a level a little lower down with respect to the running plane.

* * * * *